UNITED STATES PATENT OFFICE.

HENRY BACON, OF CHARLESTON, MAINE.

IMPROVEMENT IN MANUFACTURE OF ARTIFICIAL STONE.

Specification forming part of Letters Patent No. 205,823, dated July 9, 1878; application filed June 24, 1878.

*To all whom it may concern:*

Be it known that I, HENRY BACON, of Charleston, in the county of Penobscot and State of Maine, have invented an Improvement in the Manufacture of Artificial Stone; and I hereby declare the following to be a full, clear, and exact description thereof.

My invention consists in a compound for artificial stone formed of sand and cement united, and solidified by dampening with a crystallizing solution formed of certain chemical ingredients to be hereinafter described, whereby a durable and economical building material is produced adapted for use in any climate, as it is impervious to water and will withstand the action of frost.

To enable others skilled in the art to understand and use my invention, I will proceed to describe the manner in which I have carried it out.

I place thirty gallons of water in a suitable vessel, and add thereto one quart of spirits of ammonia in order to soften the same. I then add twenty-five pounds of sal-soda, or any other alkaline carbonate, and stir till it is thoroughly dissolved.

Next, I take one quart of isinglass dissolved in water, and mix it with the above-mentioned solution. I now add two quarts of white glue dissolved in water, and then two quarts of Irish or Iceland moss dissolved in water, and afterward one quart of spirits of hartshorn, the latter serving as a drier.

I now place in a separate receptable one gallon of the liquid compound composed of the ingredients above specified, and dilute it with fifty gallons of pure water, and thoroughly mix them together.

I then mix thoroughly in a dry state one part of cement (more or less) and ten parts of pure sharp sand or gravel, and dampen it with a sufficient quantity of the diluted mixture above described, and then tamp in the usual manner.

If it is desired to render the stone fire-proof I add four pounds of pulverized fire-clay to the above-named quantities of cement and sand or gravel, and mix it thoroughly therewith before dampening.

Should the weather be warm and the dampening solution evaporate too quickly from the material, it may be dampened once or twice per day for several days, and also moistened with cold water, which causes the material to dry uniformly throughout its mass.

When dry the stone becomes harder and harder, as the sal-soda or any other alkaline carbonate, Iceland moss, isinglass, and white glue produce crystallization, and cause the particles of sand and cement to adhere firmly together, so as to effectually prevent the entrance of air or water and the consequent damage thereto by frost if exposed to low temperatures.

Should it be desired to use my improved stone before it becomes hard or perfectly crystallized, I apply to its exterior a thin coating of white varnish, which thus renders it insoluble in water.

Blocks and ornaments used for buildings, vases, and articles of infinite variety may be formed of the artificial stone above described by the employment of suitable molds; and my improved artificial stone may be used to advantage for sidewalks and pavements, well or mining tubing, ceilings, and inner and outer walls of buildings, and, as it will harden under water equally as well as in the open air, it is well adapted for use for canals and dams, abutments and piers of bridges, &c.

What I claim as my invention, and desire to secure by Letters Patent, is—

1. An artificial stone composed of cement and sand or gravel, united and solidified by dampening with a diluted chemical solution of water, spirits of ammonia, sal-soda, or any other alkaline carbonate, isinglass, white glue, and Irish or Iceland moss, substantially as and for the purpose set forth.

2. The herein-described liquid compound, consisting of water, spirits of ammonia, sal-soda, or any other alkaline carbonate, isinglass, white glue, and Iceland or Irish moss, substantially in the proportions named, and diluted, as set forth, for the purpose of producing the crystallization of the artificial stone, as described.

Witness my hand this 17th day of June, A. D. 1878.

HENRY BACON.

In presence of—
FREDERICK CHRISTOFER KAEMMERER,
LEO DEDRITCH WEGE.